US010329195B2

(12) United States Patent
Baroux (10) Patent No.: US 10,329,195 B2
(45) Date of Patent: Jun. 25, 2019

(54) METHOD FOR FORMING A MELT-RESISTANT GLASS FIBER PRODUCT, AND ASSOCIATED APPARATUS

(71) Applicant: BLH Technologies, Inc., Halifax (CA)

(72) Inventor: Daniel Baroux, Nova Scotia (CA)

(73) Assignee: BLH Technologies, Inc., Halifax, Nova Scotia (CA)

( * ) Notice: Subject to any disclaimer, the term of this patent is extended or adjusted under 35 U.S.C. 154(b) by 556 days.

(21) Appl. No.: 14/278,542

(22) Filed: May 15, 2014

(65) Prior Publication Data

US 2014/0246807 A1 Sep. 4, 2014

Related U.S. Application Data

(63) Continuation of application No. PCT/CA2011/050706, filed on Nov. 15, 2011.

(51) Int. Cl.
*B29C 70/40* (2006.01)
*C03C 25/005* (2018.01)
(Continued)

(52) U.S. Cl.
CPC .............. *C03C 25/005* (2013.01); *B32B 5/26* (2013.01); *B32B 17/02* (2013.01); *C03C 25/10* (2013.01);
(Continued)

(58) Field of Classification Search
CPC ..... B29C 70/50; B29C 70/502; B29C 70/508; C03C 25/007; C03C 25/101
See application file for complete search history.

(56) References Cited

U.S. PATENT DOCUMENTS 3,259,536 A * 7/1966 Gaeth ..................... C04B 28/26
106/18.11
4,118,272 A * 10/1978 Ziegler ..................... D21F 1/66
162/156
(Continued)

FOREIGN PATENT DOCUMENTS

CA 2066968 10/1992
CA 2239127 6/1997
(Continued)

OTHER PUBLICATIONS

International Search Report for corresponding International Application No. PCT/CA2011/050706 dated Jul. 26, 2012.
(Continued)

*Primary Examiner* — Matthew J Daniels
(74) *Attorney, Agent, or Firm* — Womble Bond Dickinson (US) LLP (57) ABSTRACT

A method is provided for forming a melt-resistant glass fiber product, by applying an insulating material to a glass fiber product comprised of filiform glass fibers so as to substantially coat each of the filiform glass fibers therewith, such that the coated filiform glass fibers render the glass fiber product resistant to heat. In one aspect, such a method comprises forming a wetted mixture including filiform glass fibers and insulating material comprising a fire-retarding solution, wherein the wetted mixture has a solids content of the fire-retarding solution substantially uniformly and thoroughly dispersed therethrough. An associated apparatus is also provided.

11 Claims, 2 Drawing Sheets

(51) Int. Cl.
    *C03C 25/10*         (2018.01)
    *C03C 25/12*         (2006.01)
    *B32B 5/26*          (2006.01)
    *B32B 17/02*         (2006.01)
    *C03C 25/1095*     (2018.01)

(52) U.S. Cl.
    CPC .......... *C03C 25/1095* (2013.01); *C03C 25/12* (2013.01); *B32B 2255/02* (2013.01); *B32B 2262/101* (2013.01); *B32B 2307/306* (2013.01); *B32B 2307/3065* (2013.01)

(56) References Cited

U.S. PATENT DOCUMENTS

| | | | |
|---|---|---|---|
| 5,284,700 A | | 2/1994 | Strauss et al. |
| 5,755,900 A | * | 5/1998 | Weir .................... B29C 70/086 |
| | | | 156/244.27 |
| 5,837,621 A | * | 11/1998 | Kajander ................ C03C 25/26 |
| | | | 442/143 |
| 2005/0284065 A1 | | 12/2005 | Shaffer |
| 2007/0116991 A1 | | 5/2007 | Balthes et al. |
| 2008/0138526 A1 | * | 6/2008 | Tutin .................... D04H 13/008 |
| | | | 427/372.2 |
| 2011/0266488 A1 | | 11/2011 | Didier |

FOREIGN PATENT DOCUMENTS

| | | |
|---|---|---|
| CA | 2239213 | 6/1997 |
| CA | 2 309 264 | 6/1999 |
| CA | 2 456 186 | 3/2003 |
| EP | 0 044 178 | 1/1982 |

OTHER PUBLICATIONS

International Preliminary Report on Patentability for corresponding International Application No. PCT/CA2011/050706 dated Mar. 24, 2014.

* cited by examiner

METHOD FOR FORMING A MELT-RESISTANT GLASS FIBER PRODUCT, AND ASSOCIATED APPARATUS

CROSS-REFERENCE TO RELATED APPLICATIONS

This application is a continuation of International Application No. PCT/CA2011/050706, filed Nov. 15, 2011, which International Application was published by the International Bureau in English on May 23, 2013, which is incorporated herein by reference in its entirety and for all purposes.

BACKGROUND OF THE DISCLOSURE

Field of the Disclosure

Aspects of the present disclosure relate to methods for forming improved glass fiber products, and, more particularly, to a method for forming a melt-resistant or otherwise thermally-resistant glass fiber product, and associated apparatus.

Description of Related Art

It may sometimes be desirable for particular glass fiber-based products to exhibit resistance to heat, such as that resulting from an incidental fire, in addition to fire resistance. In some instances, such a glass fiber-based insulation product may have a fire-retardant product applied thereto, post-formation, to provide some fire resistance capabilities therefor. That is, an exemplary as-formed filiform glass fiber-based insulation product may have a surface treatment, for example, a liquid fire retardant, applied thereto in order for the treated product to exhibit at least some fire resistance. Because of the nonporous nature of such filiform glass fibers, such treatments may tend to remain on exposed surfaces of the glass fibers and do not penetrate or become absorbed by the glass fibers or the insulation product itself. However, such glass fiber-based insulation products used, for example, in building construction, may be comprised of filiform glass fibers that may tend to melt in the presence of excess heat, wherein the melted glass fibers may then lose the insulation properties found in the original insulation product. Thus, while the treatment of the as-formed glass fiber-based insulation product may be somewhat effective for fire resistance, particularly with a liquid fire retardant, it may be difficult or otherwise inefficient to achieve an even and consistent fire-resistance treatment of that product, and such treatment may not necessarily render the product thermal/heat resistant. More particularly, the result of some fire resistance treatment processes involving application of a liquid fire-retardant to an as-formed glass fiber-based insulation product may be an uneven or otherwise inconsistent coverage of the fire retardant with respect to the product, with insignificant improvement in thermal/heat resistance characteristics. In those cases, the glass-fiber product may pose a hazard in the event of a fire which the product is intended to retard or otherwise provide some resistance to heat and/or flames. Further, such treatment processes may not necessarily be efficient in terms of applying the fire retardant to the glass fiber-based product, may not include provisions for capturing or recycling excess portions of the fire retardant product, and may not have the capability for preventing or restricting losses of the fire retardant due, for instance, to evaporative processes.

Thus, there exists a need for a process and associated apparatus for evenly and consistently applying a coating, for example a liquid fire retardant coating, to the fibers of a filiform glass fiber-based product such as, for example, a glass fiber-based insulation product. In some instances, it may be desirable to form an integral glass fiber product having enhanced characteristics and physical properties, compared to an existing glass fiber product, while also providing an enhanced level of heat and/or fire resistance (i.e., no or limited melting) and effectively maintaining its original insulation properties. It may also be desirable, in some instances, to have a glass fiber-based product formation process with the capability of capturing excess fire retardant and recycling the captured excess in subsequent glass fiber product manufacturing cycles, whether the excess is captured in a liquid form or in other forms, such as vapors.

BRIEF SUMMARY OF THE DISCLOSURE

The above and other needs are met by aspects of the present disclosure, wherein one such aspect relates to a method of forming a melt-resistant glass fiber product. Such a method comprises applying an insulating material to a glass fiber product comprised of filiform glass fibers so as to substantially coat each of the filiform glass fibers therewith, such that the coated filiform glass fibers render the glass fiber product resistant to heat. In one instance, such a method may comprise forming a wetted mixture including filiform glass fibers and insulating material comprising a fire-retarding solution, wherein the wetted mixture has a solids content of the fire-retarding solution substantially uniformly and thoroughly dispersed therethrough. Forming the wetted mixture may comprise, in some cases, interacting the filiform glass fibers with the fire-retarding solution such that the fire retarding solution substantially coats each of the filiform glass fibers. In particular instances, applying an insulating material may comprise applying an insulating material to a glass fiber product comprised exclusively of filiform glass fibers. In instances where the glass fiber product comprises an insulation product, the coated filiform glass fibers may facilitate the insulation product maintaining original insulation properties or otherwise experiencing minimal losses with respect thereto (i.e., prevent the filiform glass fibers from melting into solid glass and losing the insulation properties of the original insulation product).

In some instances, such a method may further comprise forming a cohesive mixture from the coated filiform glass fibers and a binding agent, and then forming the cohesive mixture into a formed glass fiber product. The cohesive mixture may, in some cases, have between about 0.1% by weight and about 50% by weight of the binding agent. Such a binding agent may comprise, for example, a binder such as a resin, a glue, a starch, and/or a starch-based resin or adhesive. In some instances, the insulating material (i.e., the fire-retarding solution) may be a suitable binding agent. In other instances, the binding agent may comprise a thickening agent such as, for example, guar gum or xanthan gum. In still other instances, the cohesive mixture may be interacted with a cohesive cellulose fiber mixture to form a composite product. In further instances, forming a cohesive mixture may be performed substantially concurrently with forming the coated filiform glass fibers or a wetted mixture. In yet other instances, such a method may include de-liquefying the wetted mixture to form dry melt-resistant filiform glass fibers, such that forming a cohesive mixture involves forming a cohesive mixture from the dry melt-resistant filiform glass fibers and a binding agent.

Another aspect of the present disclosure relates to an apparatus for forming a melt-resistant glass fiber product. Such an apparatus comprises a first mixing device configured to apply an insulating material to a glass fiber product comprised of filiform glass fibers so as to substantially coat each of the filiform glass fibers therewith, wherein the coated filiform glass fibers render the glass fiber product resistant to heat. In particular instances, the first mixing device may be configured to form a wetted mixture from filiform glass fibers and insulating material comprising a fire-retarding solution, wherein the wetted mixture has a solids content of the fire-retarding solution substantially uniformly and thoroughly dispersed therethrough. The first mixing device may be, in some cases, configured to interact the filiform glass fibers with the fire-retarding solution such that the fire retarding solution substantially coats each of the filiform glass fibers. In particular instances, the first mixing device may be configured to apply an insulating material to a glass fiber product comprised exclusively of filiform glass fibers. In instances where the glass fiber product comprises an insulation product, the coated filiform glass fibers may facilitate the insulation product maintaining original insulation properties or otherwise experiencing minimal losses with respect thereto (i.e., prevent the filiform glass fibers from melting into solid glass and losing the insulation properties of the original insulation product).

In some instances, such an apparatus may further comprise a second mixing device configured to form a cohesive mixture from the coated filiform glass fibers/the wetted mixture and a binding agent, wherein the cohesive mixture includes between about 0.1% by weight and about 50% by weight of the binding agent, and a forming device configured to form the cohesive mixture into a formed glass fiber product. A suitable binding agent may comprise, for example, a binder such as a resin, a glue, a starch, and/or a starch-based resin or adhesive. In some instances, the insulating material (i.e., the fire-retarding solution) may be a suitable binding agent. In other instances, the binding agent may comprise a thickening agent such as, for example, guar gum or xanthan gum. In yet other instances, a composite forming device may be configured to interact the cohesive mixture with a cohesive cellulose fiber mixture to form a composite product. In further instances, the first mixing device and the second mixing device are configured to substantially concurrently form the coated filiform glass fibers/wetted mixture and form the cohesive mixture. In yet other instances, a second processing device may be configured to de-liquefy the wetted mixture to form dry melt-resistant filiform glass fibers, wherein the second mixing device is configured to form a cohesive mixture from the dry melt-resistant filiform glass fibers and a binding agent.

In some aspects, the fire-retarding solution may be an aqueous fire-retarding solution. It may be preferred that the fire-retarding solution be nontoxic and/or have a neutral pH and/or be hypoallergenic and/or have any number of otherwise desirable properties. In some aspects, the fire-retarding solution may comprise any one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

In still further aspects, the first mixing device may be configured, for example, to form the wetted mixture by substantially saturating the filiform glass fibers with the fire-retarding solution and/or forming a slurry from the filiform glass fibers and the fire-retarding solution. In further aspects, the processing device may be configured to dewater the wetted mixture and to dry the dewatered wetted mixture to form the dry melt-resistant filiform glass fibers. In doing so, the wetted mixture may also be heated to facilitate the formation of the dry melt-resistant filiform glass fibers.

In yet other aspects, the apparatus may also comprise a recovery device configured to recover excess fire-retarding solution, in one of a liquid and a vapor form, from the processing device, upon the processing device de-liquefying the wetted mixture to form the dry melt-resistant filiform glass fibers. Further, the recovery device may be configured to direct the recovered excess fire-retarding solution to the first mixing device, to be added to the filiform glass fibers to form the wetted mixture, for example, in a closed-loop, fire-retarding solution recycling process.

Also, in other aspects, the processing device may be configured to form a cohesive mixture from the coated filiform glass fibers and a binding agent comprising one of a resin material and an adhesive material, and the forming device may be configured to compress the cohesive mixture to form a densified glass fiber product, extrude the cohesive mixture to form the formed glass fiber product, or mold the cohesive mixture to form the formed glass fiber product. In doing so, the cohesive mixture may be formed into a glass fiber board product.

Aspects of the present disclosure thus address the identified needs and provide other advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to apparatuses and methods for forming a melt-resistant filiform glass fiber product. As previously discussed, possible limitations in the treatment of as-formed filiform glass fiber products, such as a glass fiber-based insulation or board product, for fire resistance, particularly with a liquid fire retardant, include difficulty in achieving an even and consistent treatment of that glass fiber product, as well as difficulty in effecting thermal/heat resistance in the as-formed product. That is, the result of some fire resistance surface-treatment processes may be an uneven, non-uniform, or otherwise inconsistent or incomplete application of the fire retardant to the glass fiber product. In those cases, such uneven surface treatment may result in varying levels of fire/heat resistance of the treated glass fiber product which may, in turn, become a hazard in the event of a fire which the product is intended to retard or otherwise provide some resistance. Moreover, such surface fire-retardant treatments may have little effect on the overall thermal/heat resistance of the as-formed product.

Figure 1:
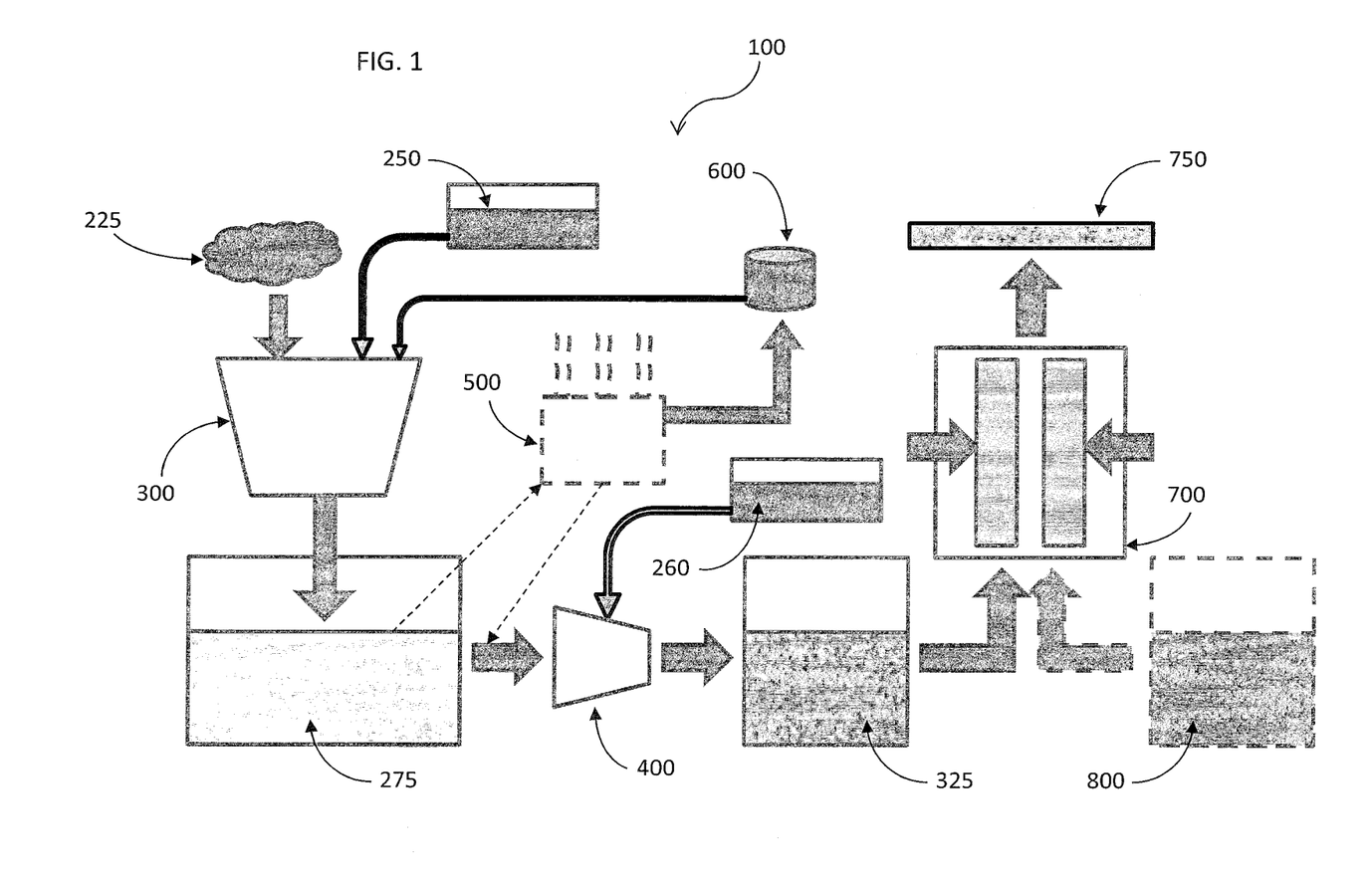
FIG. 1 schematically illustrates an apparatus for forming a melt-resistant glass fiber product, according to one aspect of the disclosure.

As such, one aspect of the present disclosure involves an apparatus for forming a melt-resistant filiform glass fiber product, such an apparatus being indicated as element 100 in FIG. 1. Such an apparatus 100 may comprise, for example, a first mixing device 300 configured to apply an insulating material 250 to a glass fiber product comprised of filiform glass fibers 225 so as to substantially coat each of the filiform glass fibers therewith, wherein the coated filiform glass fibers 275 render the glass fiber product resistant to heat. Particularly, in some aspects, the first mixing device 300 may be configured to form a wetted mixture 275 from filiform glass fibers 225 and insulating material comprising a fire-retarding solution 250, such that the wetted mixture 275 has a solids content of the fire-retarding solution 250 substantially uniformly and thoroughly dispersed therethrough. A second mixing device 400 is configured to form a cohesive mixture 325 from the coated filiform glass fibers/wetted mixture 275 and a binding agent 260, and a forming device 700 is configured to form the cohesive mixture 325 into a formed glass fiber product 750.

The filiform glass fibers may be comprised of, for example, E-glass (i.e., alumino-borosilicate glass with less than about 1% w/w alkali oxides), A-glass (i.e., alkali-lime glass with little or no boron oxide), E-CR-glass (i.e., alumino-lime silicate with less than 1% w/w alkali oxides), C-glass (i.e., alkali-lime glass with high boron oxide content), D-glass (i.e., borosilicate glass), R-glass (i.e., alumino silicate glass without MgO and CaO), and/or S-glass (i.e., alumino silicate glass without CaO but with high MgO content). Such filiform glass fibers may be formed, for example, using a direct melt process or a marble remelt process, wherein bulk glass material is melted and then extruded through appropriate bushings or nozzles. In a continuous filament process, a sizing may be applied to the drawn fibers before the fibers are wound. In a staple fiber process, the glass material can be blown or blasted with heat or steam after exiting a formation machine. For example, in rotary process formation machine, molten glass enters a rotating spinner, and due to centrifugal force is thrown horizontally/laterally outward, wherein air jets may push the glass vertically downward while a binder is applied, and wherein a resulting fiber mat may be vacuumed to a screen and the binder then cured in an oven to form a cohesive mat.

In some instances, the glass fibers implemented to form the resulting glass fiber product may be exclusively or substantially exclusively comprised of filiform glass fibers of the type disclosed herein. One skilled in the art will appreciate from the disclosure herein, however, that in some aspects, that contaminants in reasonable levels in the filiform glass fibers will likely have little if any detrimental effect with respect to the resulting as-formed glass fiber product. As such, a decontamination process/apparatus may not necessarily be contemplated (e.g., for the filiform glass fibers), but could be included, should there be a need or desire for a contaminant-free glass fiber product.

Once the filiform glass fibers are procured, the filiform glass fibers 225 may then be directed to the first mixing device 300 to be mixed with the insulating material comprising, for example, a fire-retarding solution 250, to form coated filiform glass fibers/a wetted mixture 275. The first mixing device 300 may be further configured to mix the filiform glass fibers 225 with the fire-retarding solution 250 such that the fire-retarding solution 250 is substantially uniformly distributed through the filiform glass fibers 225. In some instances, the fire-retarding solution 250 may have a particular solids content, and the first mixing device 300 may be further configured to mix the filiform glass fibers and the fire-retarding solution 250 such that the wetted mixture 275 has the solids content of the fire-retarding solution 250 substantially uniformly and thoroughly dispersed therethrough. In forming the coated filiform glass fibers/wetted mixture 275, the first mixing device 300 may be configured to substantially saturate the filiform glass fibers 225 with the fire-retarding solution 250, wherein the fire-retarding solution 250 has a first concentration of the particular solids content, and/or the first mixing device 300 may be configured to form a slurry from the filiform glass fibers 225 and the fire-retarding solution 250. In some instances, the first mixing device 300 may also be configured to add water and/or other appropriate liquid or chemical to the filiform glass fibers 225 and fire-retarding solution 250 to form the slurry. Such a procedure may be applicable, for example, to as-formed insulation products comprised of or exclusively comprised of filiform glass fibers, such as glass fiber insulations batts. For instance, such insulation batts may be saturated or substantially saturated with the insulating material comprising, for example, a fire-retarding solution, and the batt then processed, for instance, through a Fourdrinier-type arrangement or compression roller arrangement to remove excess amounts of the insulating material/fire-retardant.

In particular aspects, the insulating material may comprise the fire-retarding solution 250, wherein the fire-retarding solution may be an aqueous fire-retarding solution. It may be preferred that the fire-retarding solution be nontoxic and/or have a neutral pH and/or be hypoallergenic and/or have any number of otherwise desirable properties affecting human/animal and/or environmental safety, while maintaining the necessary efficacy, as implemented and upon exposure of the filiform glass fibers and/or the glass fiber product to heat and/or flame. In some aspects, the fire-retarding solution 250 may include a component which, standing alone, may not necessarily exhibit one or more of the previously-disclosed preferred or desirable properties. However, one skilled in the art will appreciate that other different components of the fire-retarding solution 250 may interact with the noted component so as to neutralize, minimize, or otherwise eliminate, chemically or otherwise, the non-preferred or undesirable properties of the noted component such that the overall fire-retarding solution 250 exhibits one or more of the preferred or desirable properties. In some other aspects, the fire-retarding solution 250 may comprise any one of a boron compound, a borate, an inorganic hydrate, a bromine compound, aluminum hydroxide, magnesium hydroxide, hydromagnesite, antimony trioxide, a phosphonium salt, ammonium phosphate, and diammonium phosphate, or various combinations thereof. In this regard, one skilled in the art will appreciate that various fire-retarding or fire resistant substances, either currently known or later developed or discovered, may be applicable to the disclosed processes and apparatuses herein within the scope of the present disclosure.

One skilled in the art will further appreciate that the fire-retarding solution 250 may be formed by adding a solid fire-retardant product to a liquid (i.e., water) or other chemical mixed with the filiform glass fibers such that the solid fire-retardant product forms a solution with the liquid or other chemical comprising a slurry with the filiform glass fibers 225. In other instances, the solution formed from the solid fire-retardant product and the liquid or other chemical may be used to form the wetted mixture 275 with the filiform glass fibers 225. In some aspects, the first mixing device 300 may be configured to agitate the slurry or wetted mixture, so as to substantially uniformly distribute the fire-retarding solution therethrough (i.e., such that the insulating material coats or substantially coats each of the filiform glass fibers). In other aspects, the first mixing device 300 may be configured to manipulate the wetted mixture 275, such that the solids content of the fire-retarding solution is substantially uniformly and thoroughly dispersed through the wetted mixture. The first mixing device 300 may be any machine suitable for forming the wetted mixture and/or the slurry from the filiform glass fibers and the fire-retarding solution, in the various manners discussed.

In another aspect, the first mixing device 300 may be, in some cases, configured to interact the filiform glass fibers 225 with the fire-retarding solution 250 such that the fire retarding solution substantially coats each of the filiform glass fibers. In yet another aspect, the fire-retarding solution 250 itself may be configured to substantially coat each of the filiform glass fibers when interacted therewith. In such instances, the fire-retarding solution 250 may interact with the filiform glass fibers, for example, such that the fire-retarding solution or a component thereof etches the exposed surfaces of the glass fibers so as to promote and/or facilitate bonding of particular solid components of the fire-retarding solution with the exposed surfaces of the glass fibers and/or formation of a coating over the exposed surfaces.

In some particular aspects, in order to facilitate interaction between the fire-retarding solution and the glass fibers, a processing device 500 may be provided to de-liquefy the wetted mixture 275, and to form dry melt-resistant filiform glass fibers. The processing device 500, such as a dryer, may thus be provided, as necessary and as will be appreciated by one skilled in the art, to process the wetted mixture 275 to form the dry melt-resistant filiform glass fibers. In one aspect, the processing device 500 may be configured to apply heat to the wetted mixture 275, for example, via heated air (i.e., air heated with combusted natural gas or other suitable fuel source), or through any of a variety of heating/de-liquefying/drying methods, such as, for example, microwave or infrared drying techniques, as will be appreciated by one skilled in the art.

In instances where the first mixing device 300 is configured to form a slurry from the filiform glass fibers and the fire-retarding solution, the processing device 500 may be configured to dewater the slurry, before drying the dewatered slurry to form the dry melt-resistant filiform glass fibers. Such a dewatering process may be accomplished, for example, by a suitably modified Fourdrinier-type machine, compression rollers, or other appropriate process, as will be appreciated by one skilled in the art. The slurry may also be dewatered, for instance, using a twin wire forming section and/or appropriate screening devices. Further, as previously disclosed, in order to dry the dewatered slurry, the processing device 500 may be configured to apply heat to the wetted mixture, for example, via heated air (i.e., air heated with combusted natural gas or other suitable fuel source), or through any of a variety of heating/de-liquefying/drying methods, such as, for example, microwave or infrared drying techniques, as will be appreciated by one skilled in the art. One skilled in the art will also appreciate that the processing device 500 may be configured in many different manners. For example, a suitably-configured screen device may be configured to receive the slurry, wherein the screen device may include a number of perforations. Once deposited in the screen device, the slurry may be engaged by an opposing platen, which may also be perforated. The perforations may serve to dewater the slurry, while the platen and/or the screen device may be heated to provide for drying of the dewatered slurry.

In some aspects, the apparatus 100 may also comprise a recovery device 600 configured to recover excess fire-retarding solution, in one of a liquid and a vapor form, upon the processing device 500 de-liquefying/drying the wetted mixture 275. In some instances, the recovery device 600 may also be configured to engage the first mixing device 300 for accomplishing the recovery of the excess fire-retarding solution. That is, the recovery device 600 may be configured to direct the recovered excess fire-retarding solution, removed from the wetted mixture upon de-liquefication thereof by the processing device 500, to the mixing device 300, for example, in a closed-loop, fire-retarding solution recycling process. Upon recovery of the excess portions, including liquids and vapors, by the recovery device 600, the recovered excess fire-retarding solution may be strained, filtered, or otherwise purified, and then reintroduced to the first mixing device 300 to form subsequent portions of the wetted mixture 275, such that the fire-retarding solution is substantially or entirely prevented from leaving the apparatus 100 as a waste product.

According to some aspects of the present disclosure, the dry filiform glass fibers may be rendered fire-resistant and/or melt-resistant by the coating of the glass fibers formed by particular solid components of the fire-retarding solution remaining on the glass fibers following the heating/de-liquefying/drying process and/or the bonding of such solid components to the exposed surfaces of the glass fibers. In being so classified, the dry (coated) filiform glass fibers may, for example, exhibit no loss or otherwise limited loss of volume upon exposure to heat or flame (i.e., the dry filiform glass fibers will exhibit limited if any tendency for the fibers to contract into a solid glass mass or otherwise evaporate in response to the application of heat or flame). In such instances, the solid coating may form an insulating barrier capable of diffusing incident heat (i.e., provide thermal/heat/melt resistance for the glass fibers) while also resisting ignition by incident flame (i.e., provide ignition/fire/flame resistance for the glass fibers). On this basis, according to some aspects, the dry melt-resistant filiform glass fibers (and/or coated filiform glass fibers) themselves may be implemented as a glass fiber end product. For example, the dry melt-resistant filiform glass fibers may be used as blown-in insulation or insulation sheets in batt or roll form. In instances where the glass fiber product comprises an insulation product, the coated filiform glass fibers may facilitate the insulation product maintaining original insulation properties or otherwise experiencing minimal losses with respect thereto (i.e., prevents the filiform glass fibers from melting into solid glass and losing the insulation properties of the original insulation product).

In other instances, once the coated filiform glass fibers/wetted mixture 275 are/is formed by the first mixing device 300, the second mixing device 400 may be configured to receive the coated filiform glass fibers/wetted mixture 275 and to form the cohesive mixture 325 from the coated filiform glass fibers/wetted mixture 275 and a binding agent 260 added thereto. Such a binding agent 260 may comprise, for example, a resin material or an adhesive material. In one particular example, the binding agent 260 may comprise methylene dipenyl diisocyanate (MDI). However, one skilled in the art will appreciate that the binding agent 260 may vary considerably, as appropriate, and may comprise other suitable materials such as, for instance, urea formaldehyde (UF) or phenol formaldehyde (PF). In other examples, such a binding agent may comprise a binder such as a resin, a glue, a starch, and/or a starch-based resin or adhesive. In yet other example, the insulating material (i.e., the fire-retarding solution) may itself be a suitable binding agent. In still other instances, the binding agent may comprise a thickening agent such as, for example, guar gum or xanthan gum. In some aspects, the first mixing device 300 may be configured to form the coated filiform glass fibers/wetted mixture 275 prior to the second mixing device 400 forming the cohesive mixture 325. In other instances, the first and second mixing devices 300, 400 may be configured to form the coated filiform glass fibers/wetted mixture 275 and the cohesive mixture 325 substantially concurrently (i.e., adding the insulating material/fire-retarding solution to the filiform glass fibers substantially concurrently with adding the binding agent).

In such instances, the processing device 500 may be configured to de-liquefy/dry the wetted mixture 275 such that the moisture content is substantially 0%. However, upon exposure to atmosphere, the now dry melt-resistant filiform glass fibers may absorb/retain some moisture from atmospheric humidity. As such, the dry melt-resistant filiform glass fibers may typically exhibit some moisture content (i.e., about 1% to about 3%). In further aspects of the disclosure, the second mixing device 400 may be configured to form a cohesive mixture 325 from the dry melt-resistant filiform glass fibers and a binding agent 260. In this regard, some binding agents, such as MDI, may require a particular amount of moisture present to actuate or otherwise enhance the binding properties thereof. Accordingly, prior to the second mixing device 400 forming the cohesive mixture, the second mixing device 400 and/or the processing device 500 may be configured to add moisture to the dry fire-retarding fiber mixture. Sufficient moisture may thus be added to the dry melt-resistant filiform glass fibers, as necessary or desired, to achieve the desired binding properties of the binding agent.

Once the cohesive mixture 325 is formed, a forming device 700 may be implemented to form the cohesive mixture into a formed glass fiber product 750. For example, the forming device 700 may be configured to form the cohesive mixture 325 into the formed glass fiber product 750 by compressing the cohesive mixture to form a densified glass fiber product, extruding the cohesive mixture to form the formed glass fiber product, and/or molding the cohesive mixture to form the formed glass fiber product. The formed glass fiber product 750 may, in some instances, be characterized as, for example, a glass fiber board product (i.e., in the manner of a medium density fiber (MDF) board). However, one skilled in the art will appreciate, from the disclosure herein, that the cohesive mixture 325, and the glass fiber product formed therefrom, are distinguished from fiberglass (also called glass-reinforced plastic (GRP), glass fiber-reinforced plastic (GFRP), or fiber-reinforced plastic (FRP). That is, "fiberglass" is generally characterized as a fiber reinforced polymer made of a plastic or polymeric matrix reinforced by fine fibers of glass, wherein the plastic/polymer matrix may be, for example, an epoxy, a thermosetting plastic (i.e., polyester or vinylester), or a thermoplastic. In contrast, aspects of the present disclosure implement a cohesive mixture that includes between about 0.1% by weight and about 50% by weight of the binding agent and, as such, the resulting glass fiber product may be characterized, for instance, as a filiform glass fiber network, wherein the glass fibers treated with the fire-retarding solution are held together in a cohesive manner by the binding agent (i.e., a glass fiber matrix held together by a binding agent). Such a binding agent may comprise, for example, a binder such as a resin, a glue, a starch, and/or a starch-based resin or adhesive. In some instances, the insulating material (i.e., the fire-retarding solution) may be a suitable binding agent. In other instances, the binding agent may comprise a thickening agent such as, for example, guar gum or xanthan gum.

One skilled in the art will also appreciate that, according to some aspects of the present disclosure, the cohesive mixture 325 may itself be melt-resistant due to the melt-resistant characteristics of the glass fibers, wherein such melt-resistance may be facilitated, in some instances, through heat and/or fire resistance characteristics of the selected binding agent (i.e., the cohesive mixture may in and of itself provide thermal/heat/melt resistance protective characteristics). The cohesive mixture may also be capable of resisting ignition by incident flame (i.e., provide ignition/fire/flame resistance characteristics). On this basis, according to some aspects, the cohesive mixture itself may be implemented as all of part of a glass fiber end product. For example, the cohesive mixture may be applied, whether via the forming device 700, or independently thereof, to various as-formed products as a "coating" formed upon suitable application of the cohesive mixture to the product and actuation of the binding agent (or application of a separate suitable adhesive material). In one case, for instance, the cohesive mixture may be applied to various products to form a protective "coating" therefor. For example, the cohesive mixture may be applied to various components of a building, such as a floor, interior or exterior walls, or even individual support beams, whether wood-based or metal, or otherwise applied as an encasement element (in any instance, upon suitable actuation of the binding agent or application of a separate suitable adhesive material).

One skilled in the art will further appreciate that, in some instances, the cohesive mixture 325 may be manipulated in different manners using variants of the forming device 700 to achieve different end products. For example, in some instances, the cohesive mixture 325, including the filiform glass fibers interacted with the fire-retarding solution, may form one or more layers of the resulting product, which may be in a composite or pseudo-laminate form. More particularly, in some instances, two layers of the cohesive mixture 325, including the filiform glass fibers interacted with the fire-retarding solution, may be introduced into the forming device 700, with a suitable cohesive mixture of cellulose fibers (i.e., as disclosed in International Patent Application Serial No. PCT/CA2011/050013, filed Jan. 13, 2001, and entitled "Method for Forming a Fire-Resistant Cellulose Product, and Associated Apparatus"—see, e.g., element 800 in FIG. 1) disposed between the two layers. Upon processing by the forming device 700, the resulting end product may be characterized as having a glass fiber-cellulose-glass fiber composite or pseudo-laminate form in a sheet or board configuration. In some particular instances, the glass fiber layers may comprise exclusively or substantially exclusively glass fibers, while the cellulose layer may comprise exclusively or substantially exclusively cellulose fibers. In such particular instances, as will be appreciated by one skilled in the art, there may be some intermixing of the glass and cellulose fibers at the interfaces between the respective layers, but the resulting end product (due, for example, to interaction between the binding agents associated with each of the glass fiber and cellulose layers) would appear as in integral sheet or board.

In some aspects, the glass fiber product 750 may be formed as a sheet or board having a desired length, width, and thickness, or as a continuous sheet that is later subdivided into segments of a desired length. In some instances, the forming device 700 may be configured to engage the cohesive mixture with one of a negative die and a positive die, so as to form a glass fiber product having a surface defining a negative impression of the one of the negative die and the positive die. That is, for example, various platen may be appropriately patterned with a raised and/or depressed pattern such that the formed glass fiber product will have a corresponding surface defining a negative impression of the pattern. One skilled in the art will also appreciate that the capability of manipulating the cohesive mixture in this manner indicates that the final form of the glass fiber product need not necessarily be in planar form, but may take many different shapes, contours, and sizes in addition to that disclosed herein.

Further, in some instances, the glass fiber product formed in accordance with aspects of the present disclosure, particularly through treatment of the filiform glass fibers with the fire-retarding solution, may provide a more uniform and thorough dispersion and distribution of the fire-retarding solution within the formed glass fiber product, thus enhancing fire resistance (flame spread), as well as thermal barrier (thermal resistance/insulation) and/or other characteristics.

Figure 2:
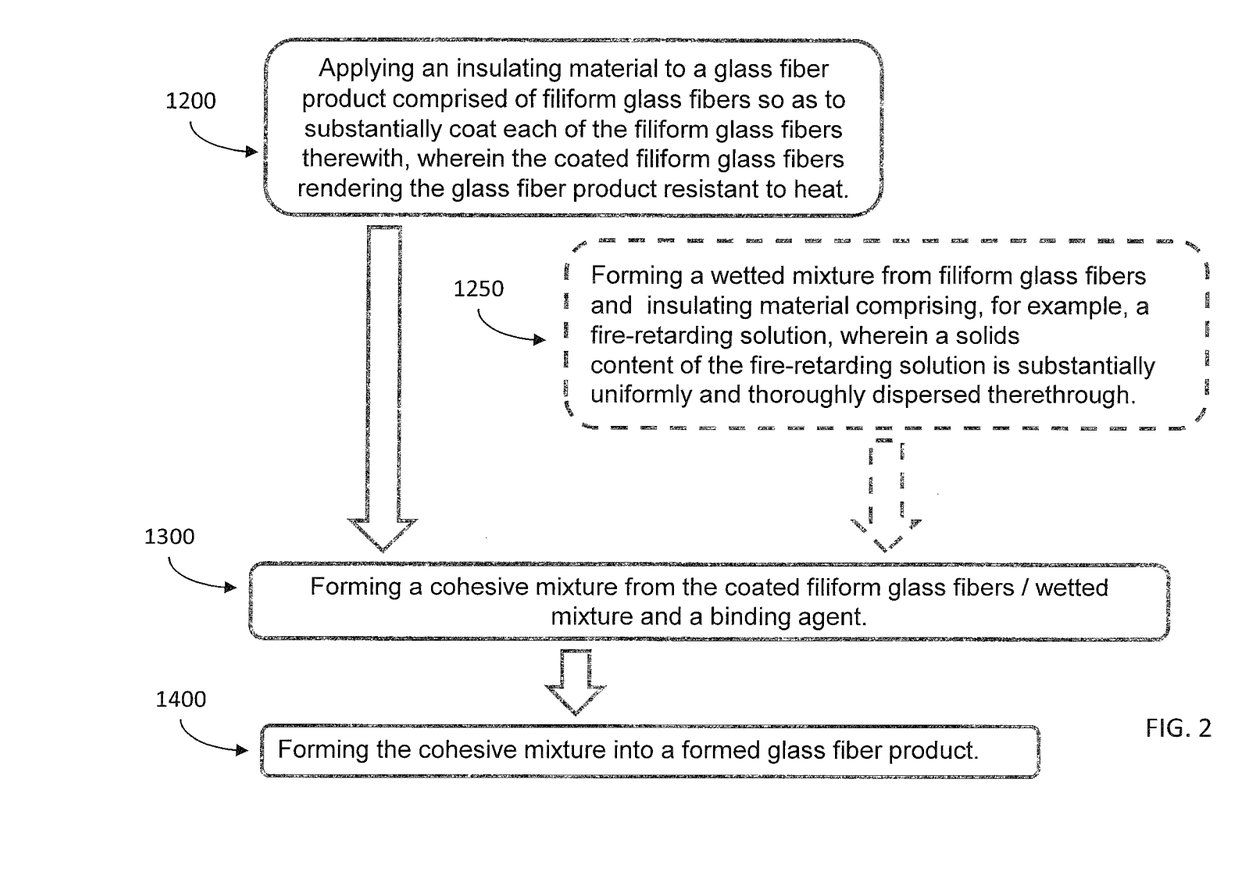
FIG. 2 schematically illustrates a method of forming a melt-resistant glass fiber product, according to one aspect of the disclosure.

Many modifications and other aspects of the disclosures set forth herein will come to mind to one skilled in the art to which these disclosures pertain having the benefit of the teachings presented in the foregoing descriptions and the associated drawings. For example, one skilled in the art that the apparatuses disclosed herein readily lead to associated processes and methods for forming a melt-resistant glass fiber product, as shown, for example, in FIG. 2. More particularly, such methods may comprise applying an insulating material to a glass fiber product comprised of filiform glass fibers so as to substantially coat each of the filiform glass fibers therewith, wherein the coated filiform glass fibers rendering the glass fiber product resistant to heat (block 1200). In one particular instance, such a method may comprise forming a wetted mixture from filiform glass fibers and an insulating material comprising, for example, a fire-retarding solution, wherein the wetted mixture has the fire-retarding solution substantially uniformly distributed therethrough (block 1250—indicated in dashed lines as being optional or exemplary). A cohesive mixture is then formed from the coated filiform glass fibers/wetted mixture and a binding agent (block 1300), and then the cohesive mixture formed into a glass fiber product (block 1400).

In addition, in some instances, the first mixing device 300 may be configured to add and/or receive other appropriate substances/materials/chemicals for addition to the filiform glass fibers. For example, the first mixing device 300 may be configured to receive a mold inhibitor; a water repellant, waterproofing, and/or otherwise water resistant substance. In any instance, it may be preferable that any additional substances received into the filiform glass fibers be suitably processed by the first mixing device 300 so as to be substantially uniformly and thoroughly distributed and dispersed within the filiform glass fibers.

Further, one skilled in the art will appreciate that, in some aspects, the cohesive mixture may be generally prepared, and can then be formed, molded, or otherwise manipulated into various end products such as, for example, boards, compounded roofing shingles, compounded roofing shakes, compounded sidewall shingles, compounded Spanish style "red clay" type roof tiles, electrical outlet encasements, doors, interior wall planking, exterior sheathing, cabinetry cores, cupboards, compounded cabinet door faces, flooring, laminated flooring, veneered compounded flooring, or the like. However, the exemplary end products presented herein are not intended to be limiting in any manner with respect to the wide variety of contemplated end products. Thus, the general cohesive material concept may be extend to instances where the end product may be produced in many different manners such as, for example, by molding, extrusion, pressing, stamping, or by any other suitable production method.

Moreover, the general cohesive material/mixture may be provided as a component or other portion of a further end assembly, in such previous examples as laminated flooring and cored cabinetry. One skilled in the art will thus appreciate that formed glass fiber products in accordance with aspects of the present disclosure may be produced such that the insulating material/fire-retarding solution is dispersed at least partially, if not consistently and uniformly, throughout. As such, the components of the end assembly comprising the thermal/heat and fire resistant glass fiber product may likely be wholly resistant to fire and/or unable to ignite and/or thermal/heat resistant, on a more permanent basis (i.e., since the fire-retarding solution is effectively integrated into the glass fiber product), as compared to simple surface treatments that may be easily removed, washed away, or subject to degradation over time.

In other aspects, other filiform fibers, whether natural or synthetic/man-made, may be implemented with respect to the methods and apparatuses disclosed herein. For example, such synthetic or man-made fibers may generally be derived from synthetic materials such as petrochemicals, though some types of synthetic fibers may be manufactured from natural cellulose, including but not limited to rayon, modal, and Lyocell™. Cellulose-based fibers may be of two types, regenerated or pure cellulose such as from the cupro-ammonium process, and modified cellulose such as the cellulose acetates. Fiber classification in reinforced plastics may fall into two classes: (i) short fibers, also known as discontinuous fibers, with a general aspect ratio (defined as the ratio of fiber length to diameter) between 20 to 60, and (ii) long fibers, also known as continuous fibers, the general aspect ratio is between 200 to 500.

Mineral fibers may be implemented, in some instances, such as purified natural quartz fibers, silica fiber made from sodium silicate (water glass), and basalt fiber made from melted basalt. Metallic fibers can be drawn from ductile metals such as copper, gold or silver and extruded or deposited from more brittle metals, such as nickel, aluminum or iron. Stainless steel fibers may also be implemented. Carbon fibers may be based on oxidized and, via pyrolysis, carbonized polymers like PAN, though the end product may be almost pure carbon. Silicon carbide fibers can be implemented, where the basic polymers are polymers and not hydrocarbons, and where about 50% of the carbon atoms are replaced by silicon atoms (i.e., poly-carbo-silanes). Polymer fibers based on synthetic chemicals may be made from, but are not limited to: polyamide nylon, PET or PBT polyester, phenol-formaldehyde (PF), polyvinyl alcohol fiber (PVA) vinylon, polyvinyl chloride fiber (PVC) vinylon, polyolefins (PP and PE) olefin fiber, acrylic polyesters, pure polyester PAN fibers used to make carbon fiber, acrylic fiber, aromatic polyamids (aramids) such as Twaron™, Kevlar™, and Nomex™, and elastomers such as Spandex™ or urethane fibers. The disclosed filiform glass fibers may also comprise, in some aspects, microfibers (i.e., sub-denier fiber such as polyester drawn to 0.5 dn (Denier). Generally, microfibers may be ultra-fine fibers (i.e., glass or meltblown thermoplastics) that may be formed, for example, by extruding fiber that is then split into multiple finer fibers.

Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming a melt-resistant glass fiber product, said method comprising:
   applying an insulating material to filiform glass fibers, by forming a wetted mixture including the filiform glass fibers and the insulating material comprising a fire-retarding solution such that the fire retarding solution coats each of the filiform glass fibers, the wetted mixture having a solids content of the fire-retarding solution dispersed therethrough, and the coating rendering the coated filiform glass fibers resistant to heat;
   de-liquefying the coated filiform glass fibers to form dry coated filiform glass fibers having a moisture content of between 0% and about 3%;
   forming a cohesive glass fiber mixture from the dry coated filiform glass fibers and a glass fiber binding agent;
   introducing a layer of a cohesive cellulose fiber mixture into a forming device between two layers of the cohesive glass fiber mixture, such that the layers are adjacent to each other; and
   intermixing glass and cellulose fibers at interfaces between the cohesive cellulose fiber mixture layer and each of the cohesive glass fiber mixture layers to form the adjacent layers into an integral composite sheet or board product, using the forming device.

2. A method according to claim 1, wherein applying an insulating material comprises applying an insulating material to exclusively filiform glass fibers.

3. A method according to claim 1, wherein forming a cohesive glass fiber mixture is performed concurrently with applying an insulating material to the filiform glass fibers.

4. A method according to claim 1, wherein forming a wetted mixture further comprises one of saturating the filiform glass fibers with the fire-retarding solution and forming a slurry from the filiform glass fibers and the fire-retarding solution.

5. A method according to claim 1, wherein forming a wetted mixture further comprises forming a wetted mixture from the filiform glass fibers and the fire-retarding solution comprising one of a boron compound, a phosphorus compound, a chlorine compound, a fluorine compound, an antimony compound, a borate compound, a halogen compound, boric acid, an inorganic hydrate, a bromine compound, aluminum hydroxide, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

6. A method according to claim 1, wherein de-liquefying the coated filiform glass fibers to form dry coated filiform glass fibers further comprises:
   dewatering the coated filiform glass fibers; and
   drying the dewatered coated filiform glass fibers to form the dry coated filiform glass fibers.

7. A method according to claim 1, wherein de-liquefying the coated filiform glass fibers to form dry coated filiform glass fibers further comprises heating the coated filiform glass fibers to form dry coated filiform glass fibers.

8. A method according to claim 1, further comprising:
   recovering excess fire-retarding solution, in one of a liquid and a vapor form, upon de-liquefying the coated filiform glass fibers to form the dry coated filiform glass fibers; and
   adding the recovered excess fire-retarding solution to the filiform glass fibers to form an additional quantity of the coated filiform glass fibers.

9. A method according to claim 1, wherein forming a wetted mixture further comprises forming a wetted mixture from the filiform glass fibers and one of an aqueous fire-retarding solution, a nontoxic liquid fire-retarding solution, and a neutral pH liquid fire-retarding solution.

10. A method according to claim 1, wherein forming a cohesive glass fiber mixture further comprises forming a cohesive glass fiber mixture from the dry coated filiform glass fibers and the glass fiber binding agent comprising one of a resin material and an adhesive material.

11. A method according to claim 1, wherein forming a cohesive glass fiber mixture from the dry coated filiform glass fibers and the binding agent further comprises forming a cohesive glass fiber mixture having between about 0.1% by weight and about 50% by weight of the binding agent.

* * * * *